US012783178B2

(12) United States Patent
He et al.

(10) Patent No.: US 12,783,178 B2
(45) Date of Patent: Nov. 3, 2026

(54) CACHE TECHNIQUES FOR MEMORY SYSTEM READ COMMANDS

(71) Applicant: Micron Technology, Inc., Boise, ID (US)

(72) Inventors: Deping He, Boise, ID (US); Liang Yu, Boise, ID (US); Caixia Yang, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/243,672

(22) Filed: Jun. 19, 2025

(65) Prior Publication Data

US 2026/0003542 A1 Jan. 1, 2026

Related U.S. Application Data

(60) Provisional application No. 63/666,066, filed on Jun. 28, 2024.

(51) Int. Cl.
*G06F 3/06* (2006.01)

(52) U.S. Cl.
CPC .......... *G06F 3/0659* (2013.01); *G06F 3/0611* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 9,390,023 | B2 * | 7/2016 | Kessler | G06F 9/00 |
| 2018/0210805 | A1 * | 7/2018 | Botman | G06F 9/3001 |
| 2023/0022998 | A1 * | 1/2023 | Shah | G06F 3/0659 |
| 2023/0063564 | A1 * | 3/2023 | Fisher | G06F 12/0246 |
| 2023/0185723 | A1 * | 6/2023 | Ge | G06F 12/0246 711/118 |
| 2023/0350571 | A1 * | 11/2023 | Shirakawa | G11C 16/10 |
| 2025/0284403 | A1 * | 9/2025 | Xu | G06F 3/0679 |
| 2026/0133918 | A1 * | 5/2026 | Viswanathan | G06F 13/1689 |

OTHER PUBLICATIONS

"International Search Report and Written Opinion of the International Searching Authority," issued in connection with Int'l Appl. No. PCT/US2025/035526, dated Oct. 30, 2025 (10 pages).

* cited by examiner

*Primary Examiner* — Sean D Rossiter
(74) *Attorney, Agent, or Firm* — Holland & Hart LLP

(57) ABSTRACT

Methods, systems, and devices for cache techniques for memory system read commands are described. A memory device of a memory system may reduce latency associated with cache access operations based on receiving a multi-plane command from the memory system. For example, the memory system may transmit an access command that indicates (e.g., using one or more bits, via a prefix associated with the command) that an access operation is for a multi-plane read of the memory device. The memory device may transfer data from a first cache of the memory device to a second cache of the memory device prior to receiving each address indication for the access operation. As such, the memory device may concurrently perform the transfer of the data with the receiving of at least one address indication, thereby reducing latency associated with the access operation and response times of the memory system.

22 Claims, 5 Drawing Sheets

CACHE TECHNIQUES FOR MEMORY SYSTEM READ COMMANDS

CROSS REFERENCE

The present application for patent claims priority to U.S. Patent Application No. 63/666,066 by He et al., entitled "CACHE TECHNIQUES FOR MEMORY SYSTEM READ COMMANDS," filed Jun. 28, 2024, which is assigned to the assignee hereof, and which is expressly incorporated by reference in its entirety herein.

TECHNICAL FIELD

The following relates to one or more systems for memory, including cache techniques for memory system read commands.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
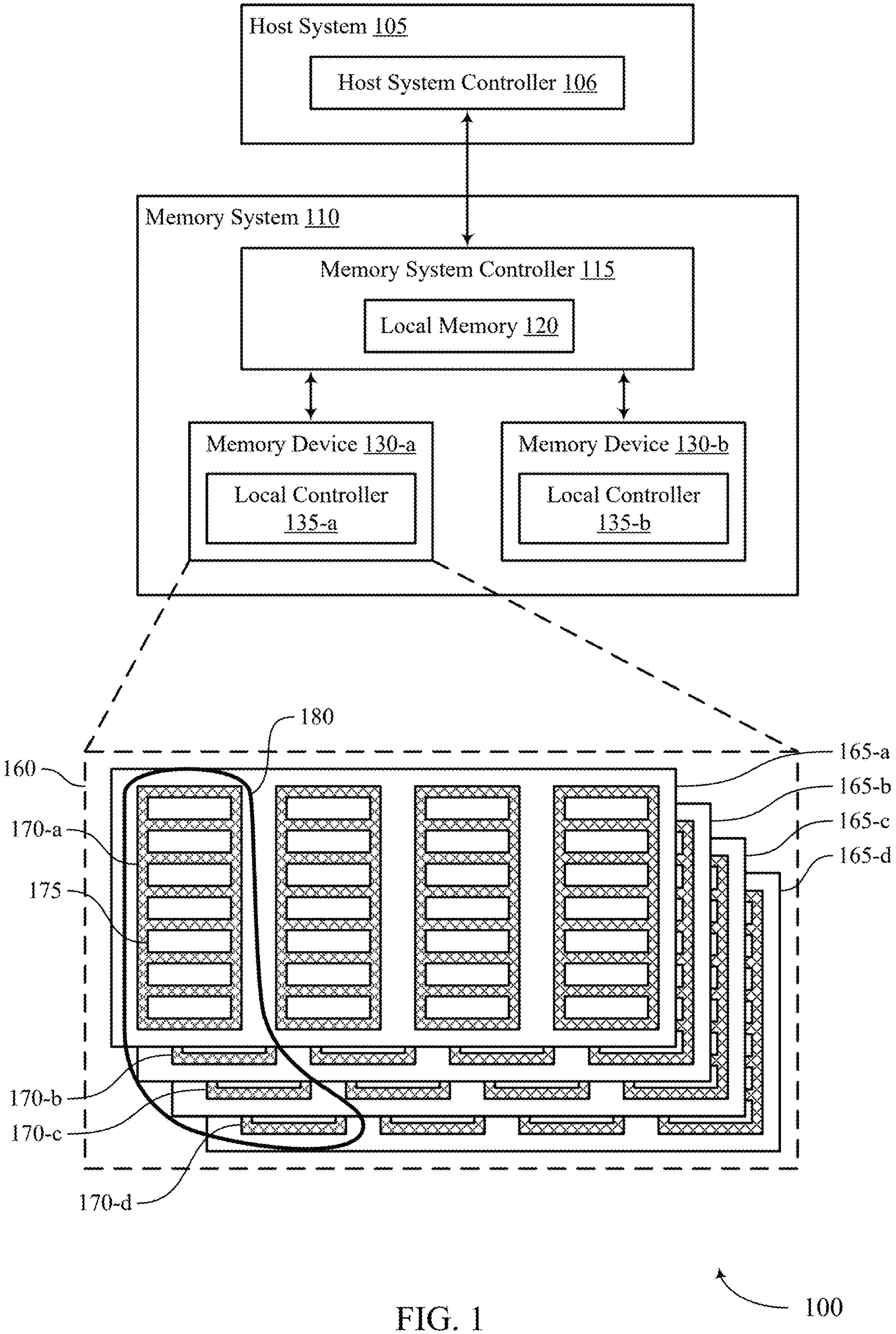
FIG. 1 shows an example of a system that supports cache techniques for memory system read commands in accordance with examples as disclosed herein.

Some memory devices may store data at one or more caches (e.g., along a data path) after or as part of performing an access operation. For example, a read command may be issued by a host system, or a portion of a memory system, to read data from one or more memory cells (e.g., of the memory system, of a memory device included in the memory system). In response, the data may be transferred from the memory cells to (e.g., via) one or more caches before being output. In some implementations, such as for a sequential read command (e.g., a multi-plane read command, an all-plane cache read command, a command to read data that was sequentially written), transfer of data from an array of memory cells may involve receiving indications (e.g., commands, address indications) of each of multiple portions of a memory array (e.g., each of multiple planes of memory cells) being read before completing a transfer of information from one storage location to another (e.g., along a data path, along an output path, from a first cache to a second cache). However, relying on separate address indications for each portion of a multiple-portion (e.g., sequential, multi-plane) read operation may involve latency that reduces performance for these and other sequential read commands and operations, including when data may be transferred along a data path more quickly than the multiple indications are communicated.

In accordance with examples as described herein, a memory device may reduce latency associated with cache access operations based on (e.g., responsive to, performed in accordance with) receiving an indication of a multi-plane command. For example, a transmitted access command may indicate (e.g., using one or more bits, using a prefix associated with the command) that an access operation is for a multi-plane read of the memory device. The memory device may transfer data from a first cache of the memory device to a second cache of the memory device prior to receiving one or more (e.g., each) address indications for the access operation. As such, the memory device may concurrently perform the transfer of the data between caches and the reception of at least one address indication, thereby reducing latency associated with the access operations and improving response time and throughput associated with such read commands (e.g., sequential read commands, multi-plane read commands, cache read commands).

In addition to applicability in memory systems as described herein, techniques for multi-plane cache access as described herein may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by reducing access latencies and improving memory access speeds, which may decrease processing or latency times, improve response times, or otherwise improve user experience, among other benefits.

Features of the disclosure are illustrated and described in the context of systems, devices, and circuits. Features of the disclosure are further illustrated and described in the context of timing diagrams, process flows, and flowcharts.

FIG. 1 shows an example of a system 100 that supports cache techniques for memory system read commands in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically crasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*. A local controller 135 may be or include a microcontroller, special purpose logic circuitry (e.g., a field programmable gate array (FPGA), an application specific integrated circuit (ASIC), a digital signal processor (DSP)), or any other suitable processor or processing circuitry.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system 110, or one or more memory device 130, may store (e.g., transfer, buffer) data at one or more caches after or as part of performing an access operation. For example, a read command may be issued by a host system 105 (e.g., a host system controller 106), or a portion of a memory system 110 (e.g., a memory system controller 115, which may be determined by the memory system controller 115 such as for a media management operation, or conveyed or translated based on (e.g., responsive to, in accordance with) a read command received from a host system 105), to read memory cells of one or more dies 160 (e.g., of a memory system 110, of a memory device 130). In response, the data may be transferred from the memory cells (e.g., via a sense component, such as one or more sense amplifiers, which may be coordinated by a local controller 135) to one or more caches before being output (e.g., from the memory device 130 to a memory system controller 115, from the memory system 110). In some implementations, such as for a sequential read command (e.g., a multi-plane read command, an all-plane cache read command, a command to read data that was sequentially written, a command to read multiple planes 165 of a virtual block 180), transfer of data from an array of memory cells may involve receiving indications (e.g., commands, address indications) of each of the planes 165 being read before completing a transfer of information from one storage location to another (e.g., along a data path, along an output path, from a first cache to a second cache). However, relying on separate address indications for each plane 165 of a multiple-plane read operation may involve latency that reduces performance for these and other sequential read commands and operations, including when data may be transferred along a data path more quickly than the multiple indications are communicated.

In accordance with examples as described herein, a memory device 130 (e.g., of a memory system 110, as a standalone memory device 130) may reduce latency (e.g., read operation latency, cache read latency) associated with cache access operations based on (e.g., responsive to) receiving an indication of a multi-plane command (e.g., from a memory system controller 115, from a host system controller 106). For example, a transmitted access command may indicate (e.g., using one or more bits, using a prefix associated with the command) that an access operation is for a multi-plane read of the memory device 130 (e.g., to read multiple planes 165). The memory device 130 may transfer data from a first cache of the memory device 130 to a second cache of the memory device 130 (e.g., multiple caches along an output path of the memory device 130) prior to receiving each address indication for the access operation. As such, the memory device 130 may concurrently perform the transfer of the data between caches and the reception of at least one address indication, thereby reducing latency associated with the access operations and improving response time and throughput associated with such read commands (e.g., sequential read commands, multi-plane read commands, cache read commands).

The system 100 may include any quantity of non-transitory computer readable media that support cache techniques for memory system read commands. For example, a host system 105 (e.g., a host system controller 106), a memory system 110 (e.g., a memory system controller 115), or a memory device 130 (e.g., a local controller 135), or any combination thereof may include or otherwise may access one or more non-transitory computer readable media storing instructions (e.g., firmware, logic, code) for performing the functions ascribed herein to the host system 105, the memory system 110, or the memory device 130, or combination thereof. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Figure 2:
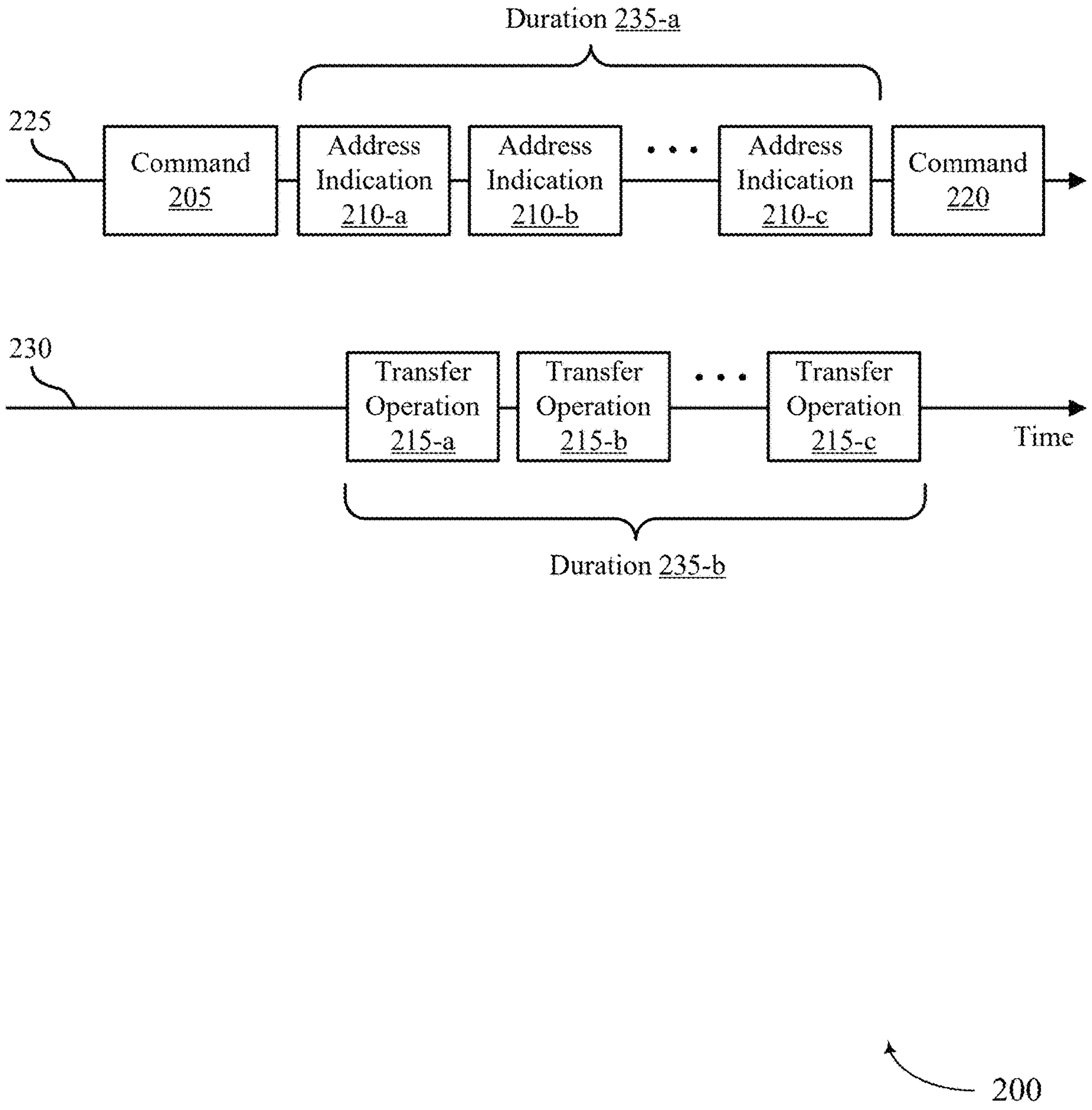
FIG. 2 shows an example of a timing diagram that supports cache techniques for memory system read commands in accordance with examples as disclosed herein.

FIG. 2 shows an example of a timing diagram 200 that supports cache techniques for memory system read commands in accordance with examples as disclosed herein. The timing diagram 200 illustrates example timing associated with commands and operations performed at a memory system 110, or portion thereof (e.g., at a memory device 130). In some examples, operations shown by the timing diagram 200 may be omitted or performed in a different order (e.g., or with a different timing) than shown, or other operations not shown may be added to the timing diagram 200.

The timing diagram 200 includes a timeline 225 that depicts signaling (e.g., commands, indications) conveyed via a bus of a memory system 110 (e.g., a command bus, a command interface, a CMD interface, a bus between a local controller 135 and a memory system controller 115 or a host system controller 106), which may have a bus width corresponding to one or more bits. The timing diagram 200 also includes a timeline 230 that depicts operations performed by the memory device 130 (e.g., via a local memory controller 135, or other processing circuitry), which may be responsive to signaling of the timeline 225.

In some examples, a memory device 130 may communicate data associated with an access operation (e.g., a read operation) along a data path of the memory device 130 having one or more caches (e.g., one or more caches in series along a data path between a memory array and an output of the memory device 130). For example, the memory device 130 may transfer data from a memory array to a first cache (e.g., via one or more sense amplifiers) in response to a read command. If the memory device 130 receives another access command for the data, the memory device 130 may transfer the data from the first cache to a second cache, or from a second cache to an output driver of the memory device 130, or both. In some examples, to output data stored at a first cache (e.g., a primary data cache), the memory device 130 may transfer the data to a second cache (e.g., a secondary data cache), and then output the data from the second cache (e.g., to a memory system controller 115, to a host system controller 106).

In some implementations, a memory device 130 may experience latency associated with reading the data from a first cache, such as during the transferring data from the first cache to a second cache. For example, to access a sequential set of data (e.g., sequentially-written data, stored at multiple planes of the memory device 130), a memory device 130 may initiate operations to access a memory array to retrieve data in response to a command 205 (e.g., a 00h command), but may not initiate a transfer of the data from a first cache until after the memory device 130 (e.g., via the bus) receives a command 220 (e.g., a 31h command), which may indicate an end of the address indications 210 (e.g., 32h indications) corresponding to each address of the sequential set of data to be accessed (e.g., for each plane 165). As such, the memory device 130 may not begin performing transfer operations 215 (e.g., associated with transferring data from a cache) until after the command 220, which may delay outputting the data from the memory device 130 or the memory device 130 being ready for a subsequent command.

In accordance with examples as described herein, a memory device 130 may receive (e.g., from a memory system controller 115, from a host system 105) a command 205 that indicates a multi-plane read (e.g., as a multi-plane command, a multi-plane 00h command, an all-plane cache read command) of one or more memory arrays of the memory device 130 (e.g., of one or more dies 160). In some examples, a command 205 may be configured as or include a prefix for a read command (e.g., as one or more bit indications), and the prefix may indicate that the read command is for data stored at a plurality of planes 165 (e.g., physically adjacent planes 165) of the memory device 130 (e.g., using a single bit value). Additionally, or alternatively, a multi-plane indication may be a separate indication or command that precedes an access command (not shown), and a command 205 may indicate that the subsequent access command is for a multi-plane read of the memory device 130. In some cases, the plurality of planes 165 may correspond to each plane of the memory device 130, or a set of planes 165 of a virtual block 180, among other arrangements. Additionally, or alternatively, a command 205 (e.g., via the prefix) may indicate a quantity of planes 165 associated with (e.g., to be accessed by) the read command (e.g., using a plurality of bit values).

The memory device 130 may perform one or more transfer operations 215 (e.g., transferring data from a cache, transferring data from one cache to another) concurrently with receiving one or more address indications 210 (e.g., 32h indications) in response to receiving a command 205 (e.g., a multi-plane command, a multi-plane cache read) associated with a multi-plane read operation. For example, after receiving a command 205 associated with a multi-plane read, the memory device 130 may receive a plurality of address indications 210 (e.g., via the bus) over a duration 235-*a*. Each address indication 210, may correspond to (e.g., indicate) a respective plane 165 of the plurality of planes 165 for the read operation. For example, an address indication 210-*a* may indicate a first address (e.g., a physical address, a logical address) associated a first plane 165 of the plurality of planes 165, an address indication 210-*b* may indicate a second address associated with a second plane 165 of the plurality of planes 165, and an address indication 210-*c* may indicate a third address associated with a third plane 165 (e.g., or last plane) of the plurality of planes 165.

The memory device 130 may perform transfer operations 215 over a duration 235-*b* that at least partially overlaps with the duration 235-*a* based on (e.g., responsive to) receiving the multi-plane command 205. For example, based on an indication of a multi-plane read operation (e.g., a multi-plane read command), the memory device 130 may be able to infer more than one address of data based on a single address indication 210-*a* (e.g., in a predictive manner, in a speculative manner), and accordingly read data from multiple planes 165 based on an indication of a single plane 165 (e.g., in accordance with a sequential write configuration, in accordance with a configuration of a virtual block 180). In some examples, the memory device 130 may initiate a transfer operation 215-*a* corresponding to the first address after receiving the address indication 210-*a*, and after data has been transferred from the first address (e.g., of a first plane 165, of a first block 170) to a first cache. The memory device 130 may initiate a transfer operation 215-*b* corresponding to the second address after data has been transferred from the second address (e.g., of a second plane 165, of a second block 170) to the first cache, which may, in various examples, be before, during, or after receiving the address indication 210-*b* (e.g., as supported by an inference based on the indication of the multi-plane read associated with the command 205). Such techniques may supported for any quantity of planes 165 (e.g., any quantity of address indications), such that transfers of data from one or more memory arrays to a first cache, or from a first cache to a second cache, or both may be performed before receiving a command 220.

Accordingly, a memory device 130 may be configured to initiate transfer operations 215 prior to receiving a command 220 (e.g., a 31h command), or a final address indication 210 (e.g., the address indication 210-*c*), or both. Because the duration 235-*b* over which the memory device 130 performs the transfer operations 215 at least partially overlaps with the duration 235-*a* over which the memory device 130 receives the address indications 210, a time-to-ready (e.g., a tRCBTS2) may occur sooner at the memory device 130 (e.g., associated with completion of a transfer operation 215-*c*), which may reduce latency associated with outputting the data associated with a command 205 or for receiving a next command (e.g., another access command).

Figure 3:
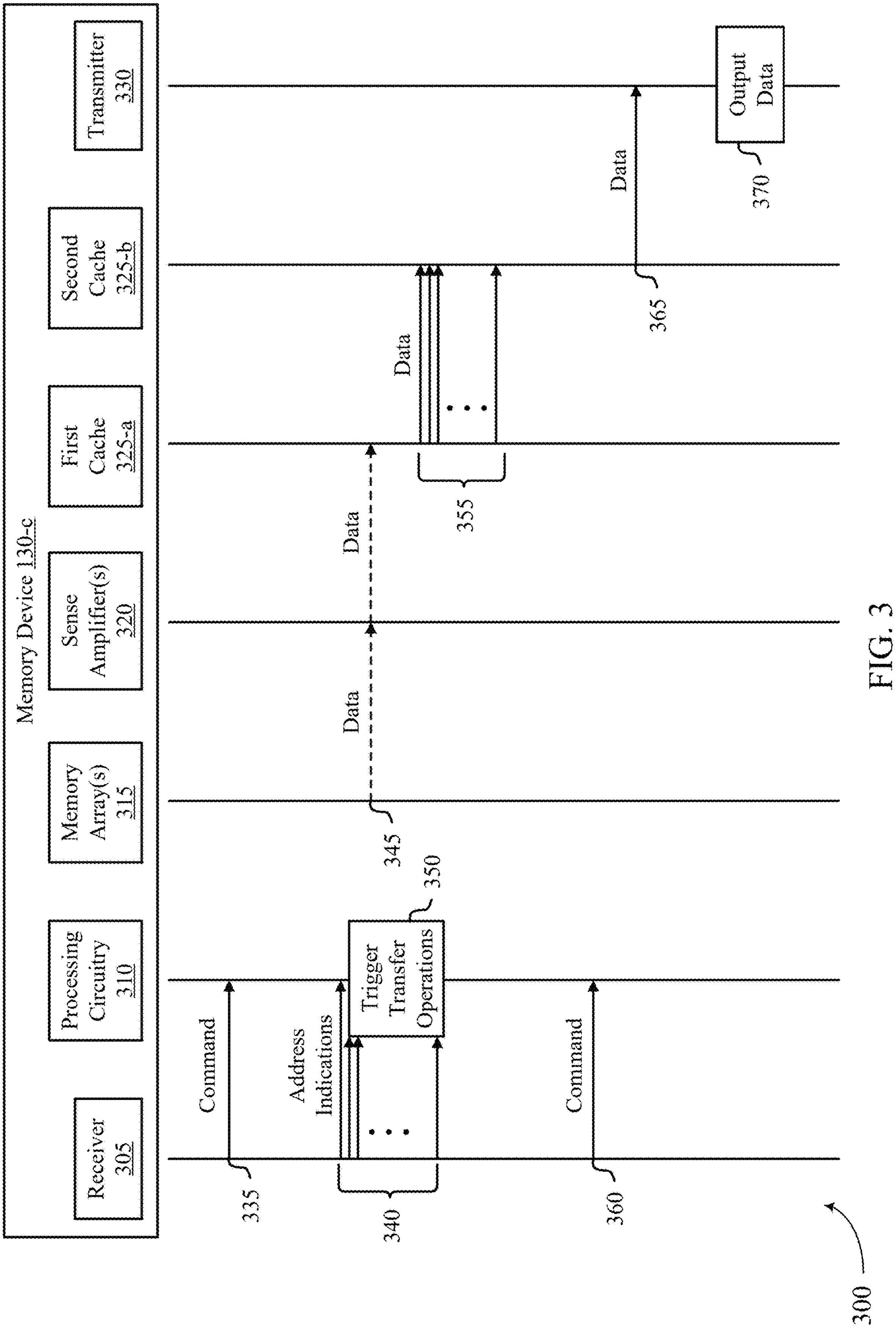
FIG. 3 shows an example of a process flow that supports cache techniques for memory system read commands in accordance with examples as disclosed herein.

FIG. 3 shows an example of a process flow 300 that supports cache techniques for memory system read commands in accordance with examples as disclosed herein. Operations of the process flow 300 may be performed by components of a memory device 130-*c* (e.g., of a memory system 110, as a standalone memory device). The memory device 130-*c* may include a receiver 305, processing circuitry 310, one or more memory arrays 315, one or more sense amplifiers 320, a first cache 325-*a*, a second cache 325-*b*, and a transmitter 330. The memory array(s) 315 may implement various storage architectures (e.g., in one or more dies 160), such as non-volatile storage architectures (e.g., NAND memory cells, among others). The first cache 325-*a*, the second cache 325-*b*, or both may also implement various storage architectures, such as latches, memory cells (e.g., different than memory cells of the memory array(s) 315, such as DRAM memory cells or SRAM memory cells), and other architectures (e.g., volatile architectures, low-latency architectures). In some examples, operations shown in the process flow 300 may be omitted or performed in a different order than shown, or operations not shown may be added to the process flow 300. In some cases, one or more operations performed by the processing circuitry 310 may be performed by one or more processors (e.g., controllers) individually or collectively executing processor-executable code stored in one or more memories of the memory device 130-*c*.

At 335, a command may be received (e.g., a command 205, a 00h command, a multi-plane command, a cache read command). The command of 335 may be received by processing circuitry 310 via the receiver 305 (e.g., from a memory system controller 115, from a host system controller 106), and may indicate (e.g., via one or more bits, via a prefix of the multi-plane access command) a multi-plane read of memory device 130-*c* (e.g., of the memory array(s) 315) associated with a set of multiple planes 165. In some examples, a first plane 165 of the multiple planes 165 may be physically adjacent (e.g., at the one or more memory arrays 315) to one or more second planes 165 of the multiple planes 165. Additionally, or alternatively, the data may be associated with a sequential write operation at the plurality of planes 165, or a virtual block 180, among other arrangements. For example, the data may have been written sequentially (e.g., in response to a prior write command) to the plurality of planes 165 of the one or more memory arrays 315.

In some examples, over a duration 340 (e.g., after receiving the command of 335), the processing circuitry 310 may receive, via the receiver 305, a plurality of address indications (e.g., address indications 210, 32h indications). Each of the address indications received during the duration 340 may indicate a respective plane 165 of the multi-plane read of the memory device 130-*c*.

In some examples, at 335, the data to be output from the multiple planes 165 of the memory device 130-*c* may not be stored at a cache 325, and the memory device 130-*c* may access the data from the memory array(s) 315 (e.g., based on determining that the data is not stored at the first cache 325-*a*). For example, at 345, the memory device 130-*c* (e.g., the processing circuitry 310) may cause the sense amplifier (s) 320 to read (e.g., sense, latch, output) the data from the memory array(s) 315. In some examples, the data may be output from the sense amplifier(s) 320. For example, the sense amplifier 320 may output the data read from the one or more memory arrays 315 (e.g., from the multiple planes 165) to the first cache 325-*a*. In some examples, the memory device 130-*c* (e.g., the processing circuitry 310) may trigger the reading of the data via the sense amplifier(s) 320 and storage of the data at the first cache 325-*a* prior to receiving a multi-plane command of 335, or in response to the multi-plane command of 335.

At 350, a plurality of transfer operations (e.g., transfer operations 215) may be triggered. For example, the processing circuitry 310 may trigger a plurality of transfer operations based on (e.g., responsive to) receiving the multi-plane command at 335 and, in some examples, based on (e.g., responsive to, in accordance with) receiving at least one of the address indications during the duration 340 (e.g., when the command 335 does not indicate an address corresponding to associated read operations). Each of the transfer operations may transfer a portion of the multi-plane read data from a respective plane 165 of the plurality of planes 165 from the first cache 325-*a* to the second cache 325-*b* (e.g., over a duration 355). The duration 355 may fully or partially overlap with the duration 340. For example, the transfer operations may be initiated (e.g., by the processing circuitry 310) after receiving a first address indication of the plurality of address indications (e.g., and prior to receiving a second or last address indication of the plurality of address indications).

At 360, another command (e.g., a command 220, a 31h command) may be received. For example, the processing circuitry 310 may receive, via the receiver 305, a command indicating a data transfer operation, which may be associated with an output of the data from the memory device 130-*c*. In some examples, the plurality of transfer operations of 355 may be initiated, completed, or both, prior to receiving the command at 360.

At 365 (e.g., in response to receiving the command at 360), the data may be output from the second cache 325-*b*. For example, the memory device 130-*c* may output the data from the second cache 325-*b* to the transmitter 330 and, at 370, the transmitter 330 may output the data (e.g., to a component of a memory system 110, to a memory system controller 115, to a host system 105, to a host system controller 106).

Accordingly, the memory device 130-*c* may initiate transfer operations (e.g., transfer operations of 355) prior to receiving the command of 360 or a final address indication of the plurality of address indications of the duration 340. As such, a latency of the memory device 130-*c* associated with outputting the data (e.g., of 370) or for receiving a next command (e.g., another access command) may be reduced.

Figure 4:
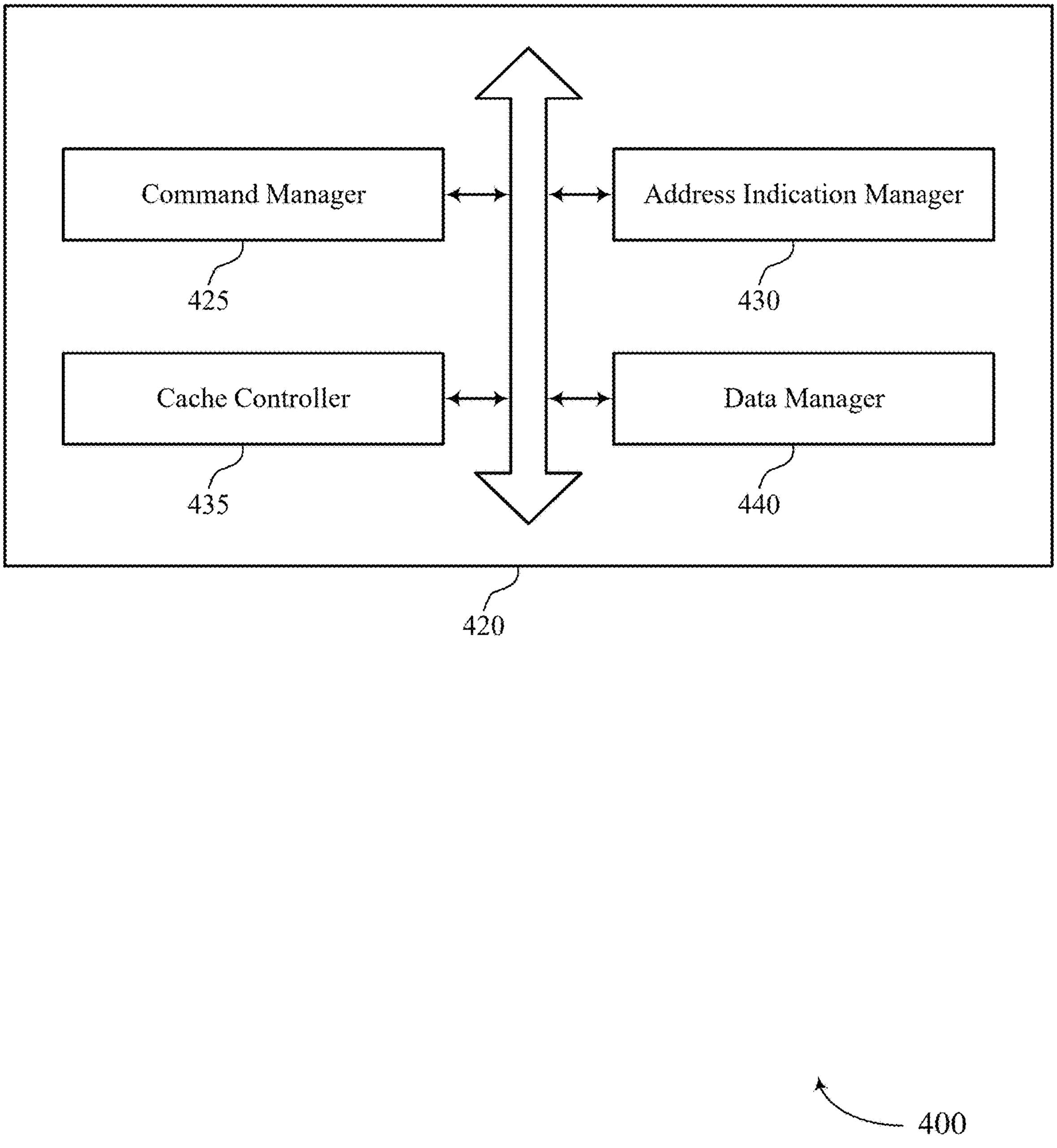
FIG. 4 shows a block diagram of a memory system that supports cache techniques for memory system read commands in accordance with examples as disclosed herein.

FIG. 4 shows a block diagram 400 of a memory system 420 that supports cache techniques for memory system read commands in accordance with examples as disclosed herein. The memory system 420 may be an example of aspects of a memory system, or a portion thereof (e.g., a memory device) as described with reference to FIGS. 1 through 3. The memory system 420, or various components thereof, may be an example of means for performing various aspects of cache techniques for memory read commands as described herein. For example, the memory system 420 may include a command manager 425, an address indication manager 430, a cache controller 435, a data manager 440, or any combination thereof. Each of these components, or components of subcomponents thereof (e.g., one or more processors, one or more memories), may communicate, directly or indirectly, with one another (e.g., via one or more buses).

The command manager 425 may be configured as or otherwise support a means for receiving a command indicating a multi-plane read of a memory device (e.g., a memory device 130). The address indication manager 430 may be configured as or otherwise support a means for receiving, over a first duration after receiving the command, a plurality of address indications, each address indication indicating a respective plane of a plurality of planes of the multi-plane read of the memory device (e.g., indicating a respective plane 165 of a plurality of planes 165). The cache controller 435 may be configured as or otherwise support a means for transferring, over a second duration that is at least partially overlapping with the first duration, data associated with each plane of the plurality of planes from a first cache of the memory device to a second cache of the memory device. The data manager 440 may be configured as or otherwise support a means for outputting, from the memory device, the data associated with each plane of the plurality of planes after transferring the data from the first cache to the second cache. In some examples, transferring the data from the first cache to the second cache is initiated prior to receiving a last address indication of the plurality of address indications.

In some examples, the address indication manager 430 may be configured as or otherwise support a means for receiving a first address indication of the plurality of address indications indicating a first plane of the plurality of planes. In some examples, the cache controller 435 may be configured as or otherwise support a means for transferring data associated with the first plane from the first cache to the second cache in response to receiving the first address indication.

In some examples, the address indication manager 430 may be configured as or otherwise support a means for receiving a second address indication of the plurality of address indications indicating a second plane of the plurality of planes, and the transfer of data associated with the first plane may be initiated prior to receiving the second address indication. In some examples, the cache controller 435 may be configured as or otherwise support a means for transferring data associated with the second plane from the first cache to the second cache in response to receiving the second address indication.

In some examples, the command manager 425 may be configured as or otherwise support a means for receiving a second command indicating a data transfer operation for the data from the first cache to the second cache, and transferring the data from the first cache to the second cache may be initiated prior to receiving the second command.

In some examples, the cache controller 435 may be configured as or otherwise support a means for transferring the data from one or more sense amplifiers of the memory device to the first cache, and transferring the data from the first cache to the second cache may be performed after transferring the data from the one or more sense amplifiers to the first cache.

In some examples, the command indicates a quantity of planes of the plurality of planes for the multi-plane read of the memory device. In some examples, a first plane of the plurality of planes is physically adjacent to one or more second planes of the plurality of planes. In some examples, the data associated with each plane of the plurality of planes is associated with a sequential write operation on the plurality of planes.

In some examples, the described functionality of the memory system 420, or various components thereof (e.g., a memory device 130), may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 420, or various components thereof, may be implemented at least in part by instructions (e.g., stored in memory, non-transitory computer-readable medium) executable by such at least one processor.

Figure 5:
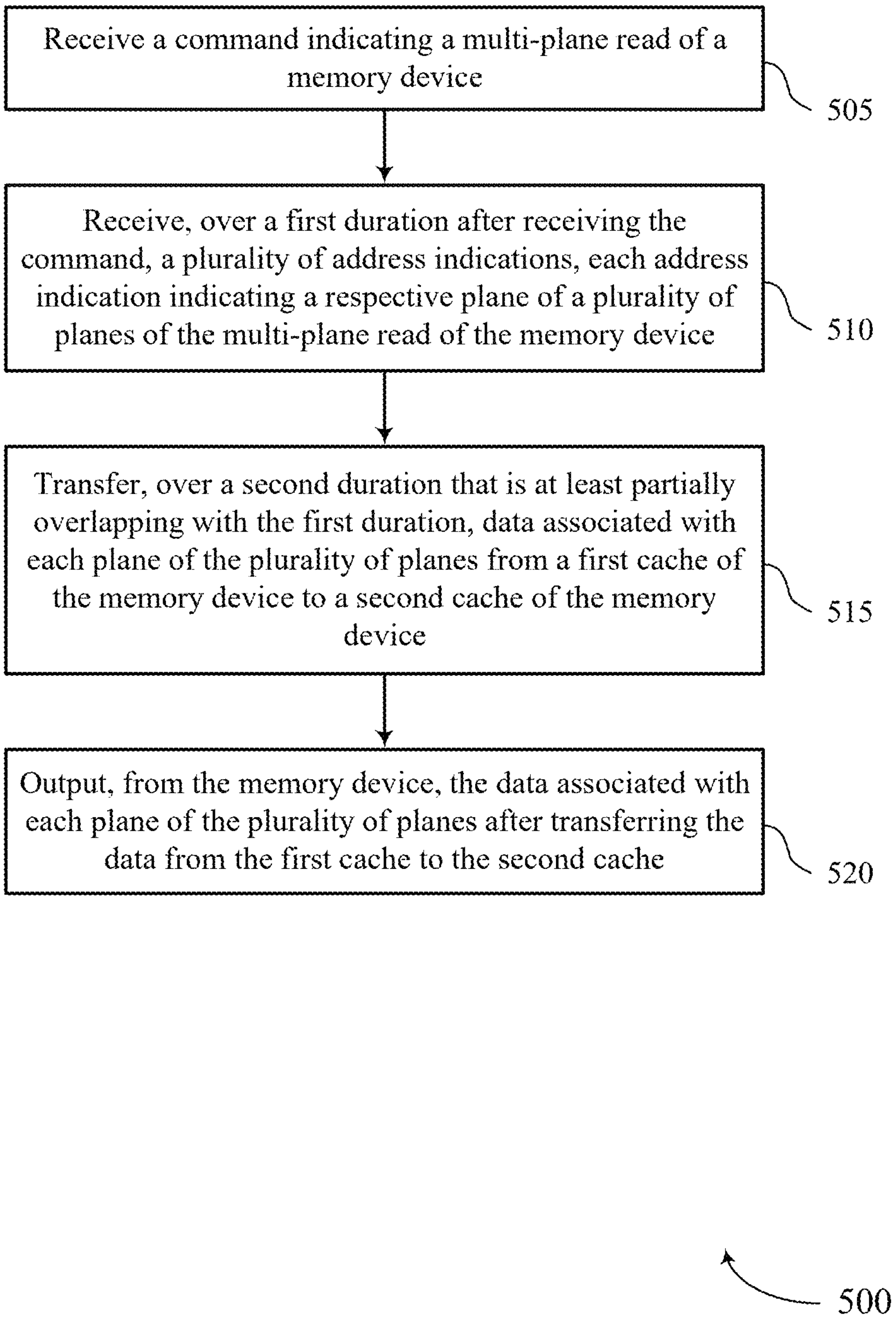
FIG. 5 shows a flowchart illustrating a method or methods that support cache techniques for memory read commands in accordance with examples as disclosed herein.

FIG. 5 shows a flowchart illustrating a method 500 that supports cache techniques for memory system read commands in accordance with examples as disclosed herein. The operations of method 500 may be implemented by a memory system, a memory device, or their components as described herein. For example, the operations of method 500 may be performed by a memory system or a memory device as described with reference to FIGS. 1 through 4. In some examples, a memory system or a memory device may execute a set of instructions to control the functional elements of the device to perform the described functions. Additionally, or alternatively, a memory system or a memory device may perform aspects of the described functions using special-purpose hardware.

At 505, the method may include receiving a command indicating a multi-plane read of a memory device. In some examples, aspects of the operations of 505 may be performed by a command manager 425 as described with reference to FIG. 4.

At 510, the method may include receiving, over a first duration after receiving the command, a plurality of address indications, each address indication indicating a respective plane of a plurality of planes of the multi-plane read of the memory device. In some examples, aspects of the operations of 510 may be performed by an address indication manager 430 as described with reference to FIG. 4.

At 515, the method may include transferring, over a second duration that is at least partially overlapping with the first duration, data associated with each plane of the plurality of planes from a first cache of the memory device to a second cache of the memory device. In some examples, aspects of the operations of 515 may be performed by a cache controller 435 as described with reference to FIG. 4.

At 520, the method may include outputting, from the memory device, the data associated with each plane of the plurality of planes after transferring the data from the first cache to the second cache. In some examples, aspects of the operations of 520 may be performed by a data manager 440 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a command indicating a multi-plane read of a memory device; receiving, over a first duration after receiving the command, a plurality of address indications, each address indication indicating a respective plane of a plurality of planes of the multi-plane read of the memory device; transferring, over a second duration that is at least partially overlapping with the first duration, data associated with each plane of the plurality of planes from a first cache of the memory device to a second cache of the memory device; and outputting, from the memory device, the data associated with each plane of the plurality of planes after transferring the data from the first cache to the second cache.

Aspect 2: The method, apparatus, or non-transitory computer-readable medium of aspect 1, where transferring the data from the first cache to the second cache is initiated prior to receiving a last address indication of the plurality of address indications.

Aspect 3: The method, apparatus, or non-transitory computer-readable medium of any of aspects 1 through 2, further including operations, features, circuitry, logic, means, or instructions, or any combination thereof for receiving a first address indication of the plurality of address indications indicating a first plane of the plurality of planes and transferring data associated with the first plane from the first cache to the second cache in response to receiving the first address indication.

Aspect 4: The method, apparatus, or non-transitory computer-readable medium of aspect 3, further including operations, features, circuitry, logic, means, or instructions, or any combination thereof for receiving a second address indication of the plurality of address indications indicating a second plane of the plurality of planes, where the transfer of data associated with the first plane is initiated prior to receiving the second address indication and transferring data associated with the second plane from the first cache to the second cache in response to receiving the second address indication.

Aspect 5: The method, apparatus, or non-transitory computer-readable medium of any of aspects 1 through 4, further including operations, features, circuitry, logic, means, or instructions, or any combination thereof for receiving a second command indicating a data transfer operation for the data from the first cache to the second cache, where transferring the data from the first cache to the second cache is initiated prior to receiving the second command.

Aspect 6: The method, apparatus, or non-transitory computer-readable medium of any of aspects 1 through 5, further including operations, features, circuitry, logic, means, or instructions, or any combination thereof for transferring the data from one or more sense amplifiers of the memory device to the first cache, where transferring the data from the first cache to the second cache is after transferring the data from the one or more sense amplifiers to the first cache.

Aspect 7: The method, apparatus, or non-transitory computer-readable medium of any of aspects 1 through 6, where the command indicates a quantity of planes of the plurality of planes for the multi-plane read of the memory device.

Aspect 8: The method, apparatus, or non-transitory computer-readable medium of any of aspects 1 through 7, where a first plane of the plurality of planes is physically adjacent to one or more second planes of the plurality of planes.

Aspect 9: The method, apparatus, or non-transitory computer-readable medium of any of aspects 1 through 8, where the data associated with each plane of the plurality of planes is associated with a sequential write operation on the plurality of planes.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or one or more processors.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory device, comprising:

one or more memory arrays;

a first cache;

a second cache; and processing circuitry configured to cause the memory device to:

receive a command indicating a multi-plane read of the one or more memory arrays;

receive, over a first duration after receiving the command, a plurality of address indications, each address indication indicating a respective plane of a plurality of planes of the multi-plane read of the one or more memory arrays;

transfer, over a second duration that is at least partially overlapping with the first duration, data associated with each plane of the plurality of planes from the first cache to the second cache; and output, from the memory device, the data associated with each plane of the plurality of planes after transferring the data from the first cache to the second cache.

2. The memory device of claim 1, wherein the transfer of the data from the first cache to the second cache is initiated prior to receiving a last address indication of the plurality of address indications.

3. The memory device of claim 1, wherein the processing circuitry is further configured to cause the memory device to:

receive a first address indication of the plurality of address indications indicating a first plane of the plurality of planes; and transfer data associated with the first plane from the first cache to the second cache in response to receiving the first address indication.

4. The memory device of claim 3, wherein the processing circuitry is further configured to cause the memory device to:

receive a second address indication of the plurality of address indications indicating a second plane of the plurality of planes, wherein the transfer of data associated with the first plane is initiated prior to receiving the second address indication; and transfer data associated with the second plane from the first cache to the second cache in response to receiving the second address indication.

5. The memory device of claim 1, wherein the processing circuitry is further configured to cause the memory device to:

receive a second command indicating a data transfer operation for the data from the first cache to the second cache, wherein transferring the data from the first cache to the second cache is initiated prior to receiving the second command.

6. The memory device of claim 1, wherein the processing circuitry is further configured to cause the memory device to:

transfer the data from one or more sense amplifiers of the memory device to the first cache, wherein transferring the data from the first cache to the second cache is performed after transferring the data from the one or more sense amplifiers to the first cache.

7. The memory device of claim 1, wherein the command indicates a quantity of planes of the plurality of planes for the multi-plane read of the one or more memory arrays.

8. The memory device of claim 1, wherein a first plane of the plurality of planes is physically adjacent to one or more second planes of the plurality of planes among the one or more memory arrays.

9. The memory device of claim 1, wherein the data associated with each plane of the plurality of planes is associated with a sequential write operation on the plurality of planes.

10. A non-transitory computer-readable medium storing code comprising instructions which, when executed by one or more processors of a memory device, cause the memory device to:

receive a command indicating a multi-plane read of the memory device;

receive, over a first duration after receiving the command, a plurality of address indications, each address indication indicating a respective plane of a plurality of planes of the multi-plane read of the memory device;

transfer, over a second duration that is at least partially overlapping with the first duration, data associated with each plane of the plurality of planes from a first cache of the memory device to a second cache of the memory device; and output, from the memory device, the data associated with each plane of the plurality of planes after transferring the data from the first cache to the second cache.

11. The non-transitory computer-readable medium of claim 10, wherein the transfer of the data from the first cache to the second cache is initiated prior to receiving a last address indication of the plurality of address indications.

12. The non-transitory computer-readable medium of claim 10, wherein the instructions, when executed by the one or more processors of the memory device, further cause the memory device to:

receive a first address indication of the plurality of address indications indicating a first plane of the plurality of planes; and transfer data associated with the first plane from the first cache to the second cache in response to receiving the first address indication.

13. The non-transitory computer-readable medium of claim 12, wherein the instructions, when executed by the one or more processors of the memory device, further cause the memory device to:

receive a second address indication of the plurality of address indications indicating a second plane of the plurality of planes, wherein the transfer of data associated with the first plane is initiated prior to receiving the second address indication; and transfer data associated with the second plane from the first cache to the second cache in response to receiving the second address indication.

14. The non-transitory computer-readable medium of claim 10, wherein the instructions, when executed by the one or more processors of the memory device, further cause the memory device to:

receive a second command indicating a data transfer operation for the data from the first cache to the second cache, wherein transferring the data from the first cache to the second cache is initiated prior to receiving the second command.

15. The non-transitory computer-readable medium of claim 10, wherein the instructions, when executed by the one or more processors of the memory device, further cause the memory device to:

transfer the data from one or more sense amplifiers of the memory device to the first cache, wherein transferring the data from the first cache to the second cache is performed after transferring the data from the one or more sense amplifiers to the first cache.

16. The non-transitory computer-readable medium of claim 10, wherein the command indicates a quantity of planes of the plurality of planes for the multi-plane read of the memory device.

17. The non-transitory computer-readable medium of claim 10, wherein a first plane of the plurality of planes is physically adjacent to one or more second planes of the plurality of planes.

18. The non-transitory computer-readable medium of claim 10, wherein the data associated with each plane of the plurality of planes is associated with a sequential write operation on the plurality of planes.

19. A method at a memory device, comprising:

receiving a command indicating a multi-plane read of the memory device;

receiving, over a first duration after receiving the command, a plurality of address indications, each address indication indicating a respective plane of a plurality of planes of the multi-plane read of the memory device;

transferring, over a second duration that is at least partially overlapping with the first duration, data associated with each plane of the plurality of planes from a first cache of the memory device to a second cache of the memory device; and outputting, from the memory device, the data associated with each plane of the plurality of planes after transferring the data from the first cache to the second cache.

20. The method of claim 19, wherein transferring the data from the first cache to the second cache is initiated prior to receiving a last address indication of the plurality of address indications.

21. The method of claim 19, further comprising:

receiving a first address indication of the plurality of address indications indicating a first plane of the plurality of planes; and transferring data associated with the first plane from the first cache to the second cache in response to receiving the first address indication.

22. The method of claim 19, further comprising:

receiving a second command indicating a data transfer operation for the data from the first cache to the second cache, wherein transferring the data from the first cache to the second cache is initiated prior to receiving the second command.

* * * * *